United States Patent [19]

Avampato et al.

[11] 3,811,950

[45] May 21, 1974

[54] BIOCHEMICAL FUEL CELL AND METHOD OF OPERATING SAME

[76] Inventors: Dominic C. Avampato, 241 Quinnipiac Ave., New Haven, Conn. 06513; Robert N. Dibella, 8 Stevens Ln., Glastonbury, Conn. 06033; Roger E. Vasas, 120 Retreat Ave., Hartford, Conn. 06106

[22] Filed: Jan. 26, 1972

[21] Appl. No.: 220,901

[52] U.S. Cl. .............................................. 136/86 E
[51] Int. Cl. .................... H01m 31/00, H01m 27/30
[58] Field of Search ........... 136/83, 86 E; 260/211.5

[56] References Cited
UNITED STATES PATENTS

| | | | |
|---|---|---|---|
| 3,228,799 | 1/1966 | Rohrback | 136/83 R |
| 3,305,399 | 2/1967 | Davis | 136/86 E |
| 3,331,705 | 7/1967 | Davis et al. | 136/86 E |
| 3,386,858 | 6/1968 | Cavanagh et al. | 136/83 |

*Primary Examiner*—A. B. Curtis
*Assistant Examiner*—H. A. Feeley

[57] ABSTRACT

A chemical fuel cell is presented wherein electrical energy is generated by the reaction of enzymes, substrates and nucleotides, the reaction being, in part, similar to parts of the tricarboxylic acid cycle in the human body.

13 Claims, 2 Drawing Figures

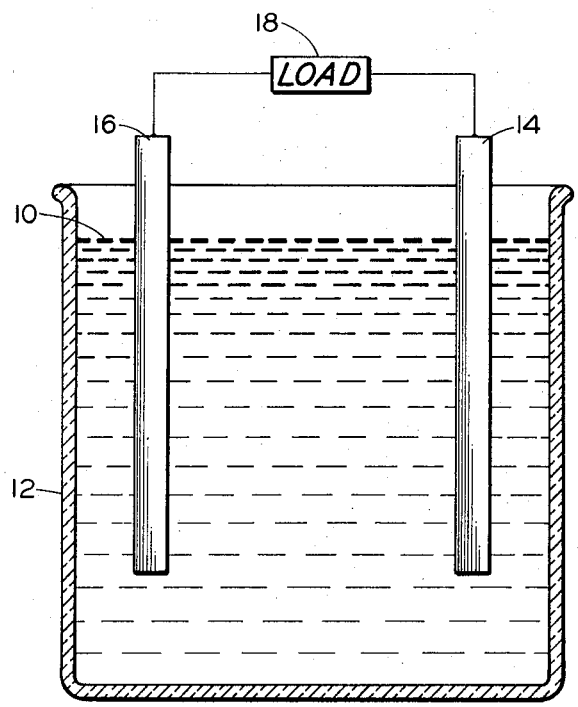

BIOCHEMICAL FUEL CELL AND METHOD OF OPERATING SAME

BACKGROUND OF THE INVENTION

This invention relates to the field chemical fuel cells. More particularly, this invention relates to the field of organic, and more specifically, biochemical fuel cells in which biochemical materials are combined to react and liberate hydrogen ions and electrons. The hydrogen ions are bound or buffered, and the electrons are collected whereby voltage potential and current are established.

The tricarboxylic acid cycle (also known as the TCA cycle, or the citric acid cycle, or the Krebs Cycle, and referred to hereinafter as the TCA cycle) is a known reaction sequence in the human body wherein energy is released and delivered to the cells of the body. The TCA cycle is a multi-reaction cycle (involving nine to 11 steps, depending on which steps are deemed to be included in the cycle).

All reactions preceding and involved in the TCA cycle occur due to the enzymes present. Enzymes for these reactions are needed in catalytic amounts for the various dehydrogenation (removal of hydrogen) reactions. The TCA cycle is basically a catalytic device, employed by the cell for maximum generation of metabolic energy from potential chemical energy. Electrons are released in the TCA cycle, and the electrons enter the electron transport system ETS wherein the living cells utilize the electrons by passing them down through a cascade of cytochrome compounds which release the high energy level of the electrons by degrees. The eventual activity of the electrons in the ETS is to combine with oxygen and hydrogen ions to produce water.

SUMMARY OF THE INVENTION

It has been observed that several of the steps in the TCA cycle involve the release of hydrogen ions and electrons, and the fuel cell of the present invention incorporates, in part, an in vitro simulation of a hydrogen ion and electron release reaction of the TCA cycle.

The fuel cell system of the present system is basically a catalytic system as is the TCA cycle of the human body. However, instead of passing the electron to a system like the ETS, (which could be done by adding cytochromes, coenzymes and other compounds normally present in the human cell environment), the present invention operates to tie up the liberated hydrogen ions, either by buffer systems or oxidizing agents. Electrons can then be removed from the system by the use of appropriate electrodes. System control may be accomplished by controlling system pH and temperature, both of which affect enzyme activity.

In the fuel cell of the present invention, a pair of electrodes are immersed in an aqueous electrolyte solution which includes the constituents necessary to simulate, in vitro, one desired reaction of the TCA cycle. The aqueous solution includes an organic substrate material which acts as the fuel in the system, a dehydrogenase enzyme, a nucleotide, and a buffer to maintain a desired system pH. A reaction occurs whereby electrons are liberated, and the electrons are collected by the electrodes whereby electric potential and current are developed.

Accordingly, one object of the present invention is to provide a novel and improved chemical fuel cell.

Another object of the present invention is to provide a novel and improved organic or biochemical fuel cell wherein organic or biochemical materials are combined to react and liberate electrons.

Still another object of the present invention is to provide a novel and improved fuel cell wherein the electrolyte includes an organic substrate, a dehydrogenase enzyme, a nucleotide, and a buffer to maintain a desired system pH.

Other objects and advantages will be apparent and understood from the following detailed description and drawing.

BRIEF DESCRIPTION OF THE DRAWING

The single FIGURE of the drawing shows a schematic representation of the structure of the fuel cell of the present invention.

DESCRIPTION OF THE PREFERRED EMBODIMENTS

The fuel cell hereof requires several constituent components of the electrolyte for proper operation of the cell. The fuel cell operates through the occurrence of selected organic chemical reactions whereby electrons are liberated. The electrolyte includes: a hydrogen-bearing substrate, which may be considered to be the fuel in the system; a dehydrogenase enzyme which is highly specific with respect to the selected substrate; a nucleotide; and a buffer to maintain a desired pH.

The substrate is a hydrogen-bearing organic material which, when reacted with a specific enzyme, will release hydrogen ions and electrons. Four such substrates are found in the TCA cycle as well as one preceding the cycle and can be used in this invention.

The dehydrogenase enzymes and the nucleotides react with the substrate to release hydrogen ions and electrons, the nucleotides and the enzymes both promoting the reaction whereby hydrogen ions and electrons are released. Only relatively small amounts of the enzymes and nucleotides are needed, and thus the system is inherently economic.

The buffer binds or ties up the liberated hydrogen ions, thereby preventing the electrolyte solution from becoming drastically acidic. A drastically acidic solution would result in total loss of enzyme activity, and the enzymes would become denatured. The preservation of enzymes by the buffer also contributes to system economy. Accordingly, it is necessary to maintain system pH at an optimum value determined by the requirements of the enzyme being used. It is expected that the pH level will ordinarily be at 6 or above, but it will be understood that a higher pH may be necessary or a lower pH may be permissible depending on the enzymes being used. Also, chemical oxidizing agents can be used to maintain system pH rather than buffers.

The constituent elements are combined to form an aqueous solution, with preferably deionized water used to form the aqueous solution. When an electrolyte is formed having the proper substrate, enzyme, nucleotide and buffer combination, electrons are liberated. Electrodes immersed in the electrolyte collect the electrons whereby voltage and current may be generated.

The following table lists five groups of constituent elements, any one of which groups may be used to form the electrolyte of a fuel cell in accordance with the present invention, in each case the indicated acid or base form the substrate being interchangeable, and being referred to interchangeably in this specification and the claims hereof:

| | Substrate | Enzyme | Nucleotide |
|---|---|---|---|
| Group 1 | Pyruvic acid (or pyruvate) and coenzyme A | Pyruvate dehydrogenase | $DPN^+$ |
| Group 2 | D-isocitric acid or D-isocitrate | isocitric dehydrogenase | $DPN^+$ |
| Group 3 | α-ketoglutaric acid and coenzyme A or α-ketoglutarate and coenzyme A | α-ketoglutarate dehydrogenase | $DPN^+$ |
| Group 4 | succinic acid or succinate | succinate dehydrogenase | FAD |
| Group 5 | L-malic acid or L-malate | malate dehydrogenase | $DPN^+$ |

Referring to the foregoing table, the substrates have the following molecular composition, and, as indicated, the acid of each may be employed or the base:

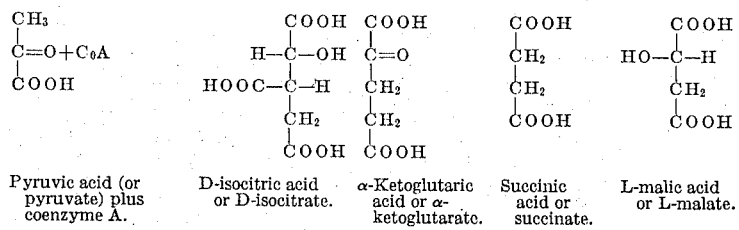

| Pyruvic acid (or pyruvate) plus coenzyme A. | D-isocitric acid or D-isocitrate. | α-Ketoglutaric acid or α-ketoglutarate. | Succinic acid or succinate. | L-malic acid or L-malate. |

The enzymes have been listed in the table according to their trivial names. The systematic name of each is as follows:

| TRIVIAL NAME | SYSTEMATIC NAME |
|---|---|
| Pyruvate dehydrogenase | Pyruvate:lipoate oxidoreductase |
| Isocitric dehydrogenase | threo-D-Isocitrate:NAD oxidoreductase |
| α-Ketoglutarate dehydrogenase | 2-Oxoglutarate:lipoate oxidoreductase |
| Succinate dehydrogenase | Succinate:(acceptor) oxidoreductase |
| Malate dehydrogenase | L-Malate:NAD oxidoreductase |

With reference to the listed substrates, the use of D and L refer to the stereo-structure of the chemicals as described in the biochemical literature. Furthermore, as is also known in the art, $DPN^+$ (DPNH) is an abbreviation for diphosphopyridine nucleotide (reduced form) and is the same as $NAD^+$ (NADH); and FAD ($FADH_2$) is an abbreviation for flavin adenine dinucleotide (reduced form).

If the constituents of Group 1 are used, the electron liberating reaction is:

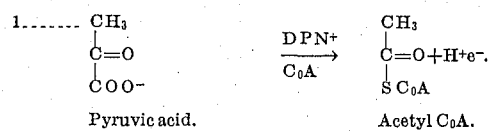

Similarly, if the constituents of Groups 2–5 are used, the electron liberating reactions are, respectively:

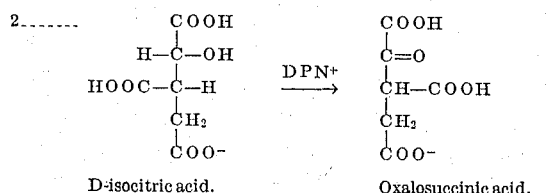

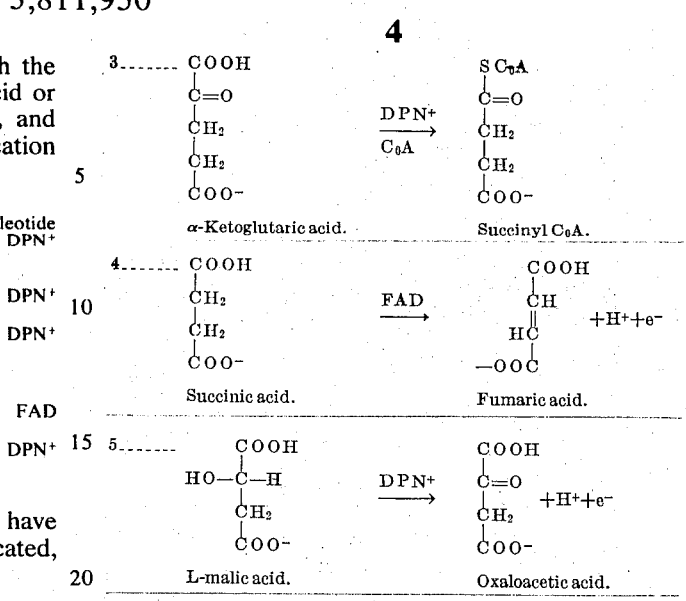

The liberated electrons are collected by electrodes placed in the electrolyte solution whereby voltage potential and current are established which may be used to power a desired load.

In accordance with standard practice, different materials are used for pairs of electrodes. As indicated above, the electrolyte solution is buffered by a selected buffering agent to maintain a pH at the optimum level for the enzyme activity as well as to prevent destruction of the enzymes and denaturing of the electrolyte solution.

A fuel cell was constructed having the structural configuration as schematically shown in the drawing. The electrolyte 10 was contained in a glass casing 12 in which electrodes 14 and 16 were immersed.

The following examples were then prepared in accordance with the present invention, reference numerals being to the single FIGURE of the drawing:

EXAMPLE 1

Maleic acid crystals were placed in a container 12 (a glass beaker in the experiment) in the presence of deionized water to form solution 10. The maleic acid hydrolized to form L-malic acid and D-malic acid. A buffer of tris (hydroxy methyl) amino methane was added to maintain a pH of 9 in solution 12. Malate dehydrogenase and $DPN^+$ were both added to solution 10 in catalytic amounts, and methylene blue was also added to solution 10. Malate dehydrogenase is highly stereoselective in that it reacts only with the L-malic acid in the solution to release hydrogen ions and electrons. The methylene blue acts to bind hydrogen ions and also as an indicator of hydrogen ion liberation in that it imparts an initial characteristic blue color to the solution which changes toward a colorless state as hydrogen ions are bound up by the methylene blue. The change in solution color from blue toward colorless was noted in this example.

A pair of electrodes 14 and 16 of copper and tin alloy were immersed in solution 10. A load 18 of 1,000 ohm resistor was connected between the electrodes. A voltage measuring device was connected across load 18 and a reading of 7 millivolts was obtained. From the relationship I=E/R it was then determined that circuit current was 7 microamperes ($7\times10^{-6}$ amperes). A voltage reading of 8 millivolts was also obtained on an unloaded circuit, i.e one in which the load was removed and the voltage measuring device was connected directly to the

EXAMPLE 2

Example 1 was repeated with the substitution of one copper electrode and one brass electrode for the electrodes of Example 1. A voltage reading of 540 millivolts was obtained across 1,000 ohm load 18, thus showing a circuit current of 0.540 milliamperes ($0.54\times10^{-3}$ amperes). A reading of 600 millivolts was also obtained with an unloaded circuit as in Example 1.

The load 18 was left connected across the electrodes in each of Examples 1, 2 and 3 for approximately about 30 minutes, and voltage measurements were then taken. No significant reduction in voltage was noted, thus indicating the fuel cell has the highly desireable characteristic of being a constant voltage device under load.

The cell of Example 1 was also shorted out by connecting a wire directly between the electrodes. After about 30 minutes the short circuit wire was removed and the voltage measuring device was connected to the electrodes. No significant voltage reduction (compared to the unloaded voltage in Example 1) was noted, thus the fuel cell has the highly desireable characteristic of maintaining its potential level notwithstanding a short across its output terminals.

We claim:

1. A biochemical fuel cell comprising:
   a container;
   an aqueous solution in said container, said solution including an organic substrate and an enzyme which is dehydrogenous with respect to the substrate whereby hydrogen ions and electrons are liberated;
   a nucleotide in said solution to promote the release of hydrogen ions and electrons;
   a buffering agent in said solution to maintain a desired pH level; and
   an anode and cathode extending into said solution.

2. A fuel cell as in claim 1 wherein said substrate is selected from the group consisting of:
   1. pyruvic acid and coenzyme A
   2. D-isocitric acid
   3. α-ketoglutaric acid and coenzyme A
   4. succinic acid
   5. L-malic acid 3. A fuel cell as in claim 2 wherein said enzyme is selected from the group consisting of:
   1. pyruvate dehydrogenase
   2. isocitric dehydrogenase
   3. α-ketoglutarate dehydrogenase
   4. succinic dehydrogenase
   5. malate dehydrogenase
   each of the enzymes (1) through (5), respectively being specific to and corresponding to substrates (1) through (5).

4. A fuel cell as in claim 3 wherein:
   said solution includes the nucleotide $DPN^+$ for a solution containing the corresponding substrate and enzymes (1), (2), (3) or (5), and said solution includes the nucleotide FAD for a solution containing the corresponding substrate and enzyme (4).

5. A fuel cell as in claim 1 wherein:
   said pH level is not less than 6.

6. A fuel cell as in claim 1 wherein:
   said aqueous solution is of deionized water.

7. A fuel cell as in claim 1 including:
   methylene blue in said solution.

8. A process for obtaining electrical power from a biochemical process including the steps of:
   forming a fuel cell containing an aqueous solution of an organic substrate and an enzyme which is dehydrogenous with respect to the substrate whereby hydrogen ions and electrons are liberated;
   promoting the release of hydrogen ions and electrons by the presence of a nucleotide in said aqueous solution;
   buffering said aqueous solution to maintain the desired pH level; and
   immersing an anode and cathode in said aqueous solution.

9. A process as in claim 8 wherein said step of forming a fuel cell containing an aqueous solution includes incorporating in said aqueous solution an organic substrate selected from the group consisting of:
   1. pyruvic acid and coenzyme A
   2. D-isocitric acid
   3. α-ketoglutaric acid and coenzyme A
   4. succinic acid
   5. L-malic acid 10. The process as in claim 9 wherein the step of forming a fuel cell having an aqueous solution includes incorporating an enzyme selected from the group consisting of:
    1. pyruvate dehydrogenase
    2. isocitric dehydrogenase
    3. α-ketoglutarate dehydrogenase
    4. succinate dehydrogenase
    5. malate dehydrogenase each of the enzymes (1) through (5), respectively being specific to and corresponding to substrates (1) through (5).

11. The process as in claim 9 wherein the step of promoting the release of hydrogen ions and electrons by the presence of a nucleotide includes:
    incorporating in said solution the nucleotide $DPN^+$ for a solution containing the corresponding substrate and enzymes (1), (2), (3) or (5), and incorporating in said solution the nucleotide FAD for a solution containing the corresponding substrate and enzyme (4).

12. The method as in claim 8 wherein said step of buffering said solution includes:
    maintaining the pH of said solution at a level not less than 6.

13. The method as in claim 8 including:
    incorporating methylene blue in said solution.

* * * * *

PO-1050
(5/69)

UNITED STATES PATENT OFFICE
CERTIFICATE OF CORRECTION

Patent No. 3,811,950   Dated May 21, 1974

Inventor(s) Dominic C. Avampato, Robert F. DiBella, Roger E. Vasas

It is certified that error appears in the above-identified patent and that said Letters Patent are hereby corrected as shown below:

In the listing of the coinventors the name "Robert N. Dibella" should be --Robert F. DiBella--

Signed and sealed this 17th day of September 1974.

(SEAL)
Attest:

McCOY M. GIBSON JR.
Attesting Officer

C. MARSHALL DANN
Commissioner of Patents